May 2, 1967 L. A. RIVOLTA 3,317,218
DEVICE FOR TEMPORARILY REPLACING AN AUTOMOTIVE
VEHICLE ROAD WHEEL
Filed Sept. 1, 1965 2 Sheets-Sheet 1
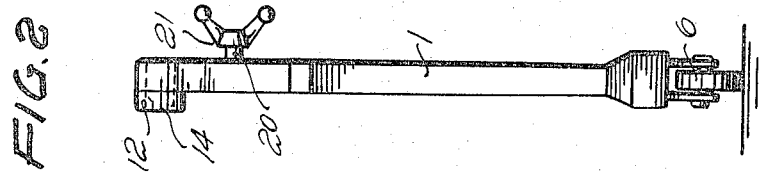
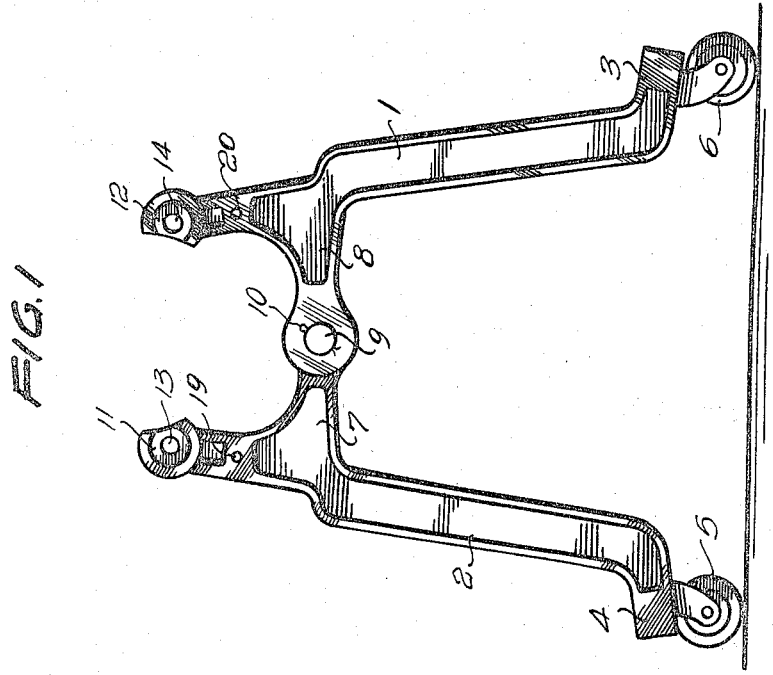
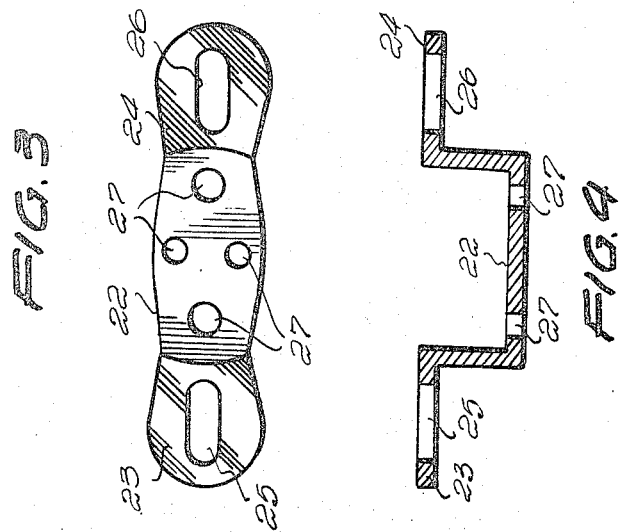
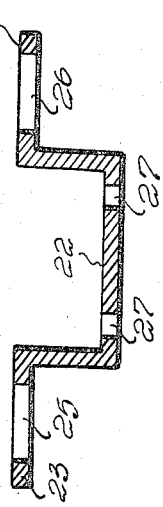
INVENTOR.
LUIS ARTURO RIVOLTA

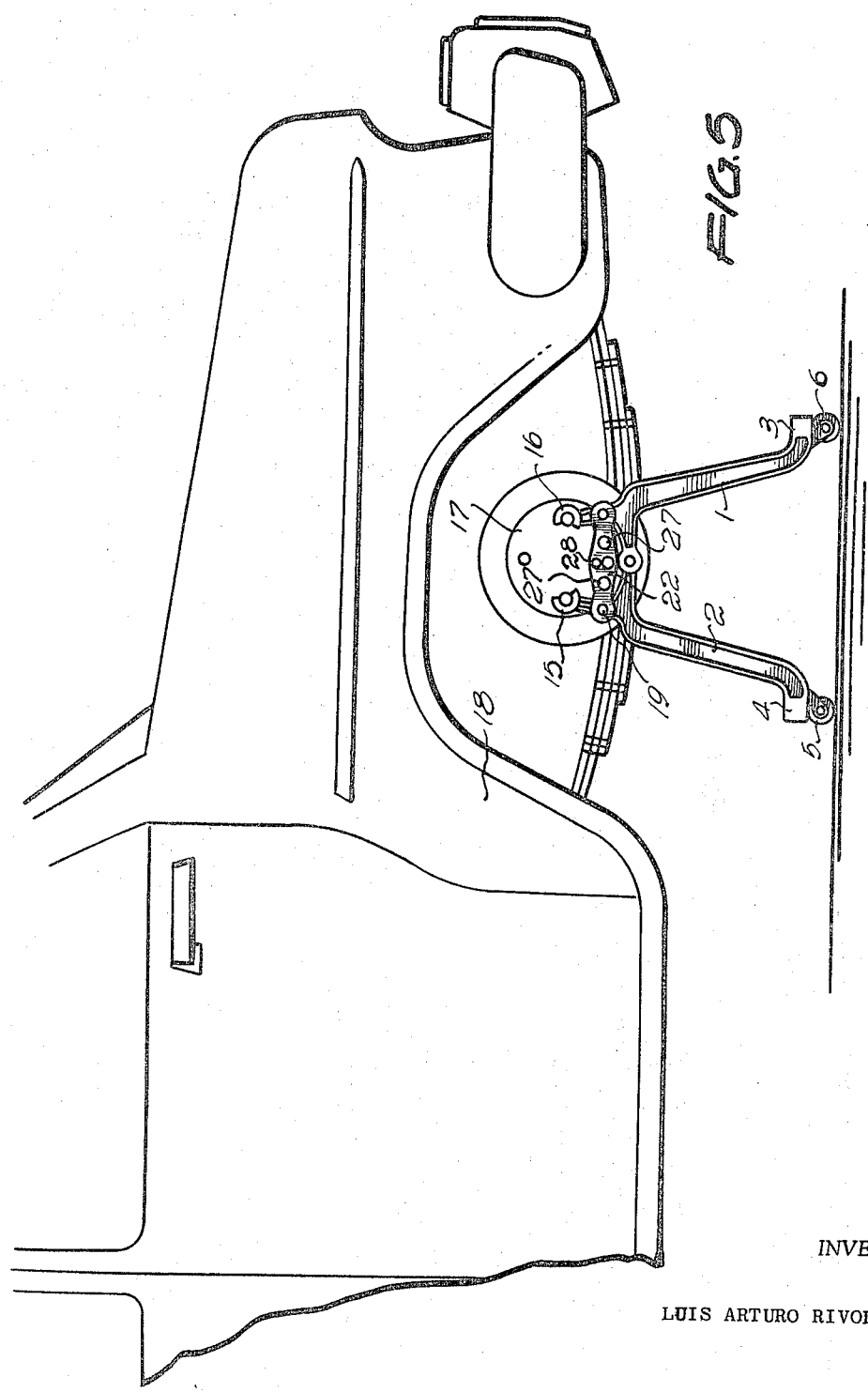

United States Patent Office 3,317,218
Patented May 2, 1967

3,317,218
DEVICE FOR TEMPORARILY REPLACING AN AUTOMOTIVE VEHICLE ROAD WHEEL
Luis Arturo Rivolta, Bolivia 240, Buenos Aires, Argentina
Filed Sept. 1, 1965, Ser. No. 484,203
7 Claims. (Cl. 280—150)

This invention relates to a device for temporarily replacing one of the road wheels of an automotive vehicle under repair.

More particularly, the invention rleates to a device capable of temporarily taking the place of an auotmotive vehicle road wheel and at the same time leaving those parts located behind the wheel exposed and accesible to the action of the men in change of checking or repairing them.

In automobile repair shops, it is customary to use a jack or other type of means for supporting the vehicle when a road wheel is removed therefrom for checking or repairing one of the parts located behind such wheel.

If the vehicle is supported by an ordinary jack or trestle, such means offer little security as regards stability in the event that the automotive vehicle under repair is pushed by another vehicle moving closely thereto, as frequently occurs in shops where the number of vehicles is large in relation to the space available for the movement thereof.

Rolling hydraulic jacks provided with horizontal piston and controlled by means of a long lever arm are well suited for the purpose, as regards stability and the possibility of moving a vehicle having its road wheels removed. However, these devices are too expensive for a repair shop to have them inactive for the duration of a repair, since a relatively large repair shop must have available several of such hydraulic jacks in order to maintain a relatively constant working rhythm.

The device of this invention solves the aforesaid drawbacks by insuring complete stability of the jacked up vehicle, permits the vehicle to be rolled from one place to another and does not require the permanent use of a jack.

From a structural point of view, the device of this invention comprises a pair of arms pivotally connected to each other by means of a pivot pin mounted in projections connected to the arms one end of each of said arms having a small wheel mounted thereon and capable of bearing on the floor, whereas the opposite end thereof has a hole engageable by a bolt provided on the vehicle brake drum. Between said hole and the aforesaid projection, each arm has fixed thereto a screw-threaded pin engageable in end openings formed in a plate also having spaced holes one of which is capable of receiving one of the remaining bolts on the drum.

A further feature of the novel device of the present invention is that the aforesaid plate connectable to said arms is preferably U-shaped, with the free ends of the arms of the "U" bent outwardly and contained in a plane parallel to the portion connecting said U-arms. The plate is so dimensioned that the end openings thereof are capable of receiving the screw-threaded pins on said arms of the device, whereas one of the holes in the mid portion thereof will receive one of the drum bolts.

Inasmuch as said U-shaped plate should be secured firmly to said arms, it is fixed thereto, for example by means of wing nuts which are screwed onto the arm screw-threaded pins.

It will be readily understood from the above brief description that the device of the present invention comprises a pair of arms the pivotal connection of which will allow their upper free ends to be moved away from each other for a distance sufficient to cause the holes therein to register with two opposite drum bolts. By causing said bolts to extend through said holes and fixing them by means of a pair of the wheel nuts, the vehicle will remain supported by the pair of wheeled arms.

In order to strengthen the assembly, the aforesaid U-shaped plate is secured to the arms, for example by means of a pair of wing nuts screwed onto the arm screw-threaded pins extending through the plate end openings, and one of the intermediate holes in the plate is caused to register with a further drum bolt which is secured to the plate by means of one of the wheel nuts. In this manner, the pair of pivoted arms will be secured to said vehicle drum by three bolts thereof and their respective nuts.

A vehicle thus supported may be rolled about the shop and will only require a jack for initially raising it to remove the vehicle wheel and mount the device, and at the time of finally removing the supporting device.

In order that the invention may be more clearly understood and readily carried into practice, one of the presently preferred embodiments thereof has been illustrated by way of example in the accompanying drawings, in which:

FIG. 1 is a front view of a pair of pivoted arms forming part of the device according to the present invention;

FIG. 2 is a side view of the pair of pivoted arms shown in FIG. 1;

FIG. 3 is a plan view of a U-shaped reinforcing plate comprised by the device of the invention;

FIG. 4 is a side view of the reinforcing plate shown in FIG. 3; and

FIG. 5 is a fragmentary schematical side view of an automotive vehicle with one of the road wheels thereof removed and replaced by the device according to the invention.

The same reference characters are used to indicate like or corresponding parts throughout the drawings.

As shown in the drawings, the device according to the present invention comprises a pair of arms 1–2 having the lower ends thereof elbowed as at 3–4 and carrying small wheels 5–6 mounted thereon.

At the zone between the ends thereof, said arms 1–2 are provided with preferably integral lateral projections 7–8 the free ends of which are formed with coaxial holes receiving a pivot pin 9 retained as by means of a key 10.

Said pivot pin 9 will allow the angular movement of the arms 1 and 2 so as to permit the opposed upper ends 11–12 to move to and away from each other.

Said upper arm ends 11–12 are provided with respective holes 13–14 to be engaged by two bolts such as 15–16 on the drum 17 of a vehicle 18 (see FIG. 5).

At a point between said projections 7–8 and ends 11–12, the arms 1–2 are provided with respective screw-threaded pins 20–19 adapted to receive wing nuts such as 21 shown in FIG. 2.

By means of said wing nuts 21 there is secured to the arms 1–2 a U-shaped plate 22 the ends of which are outwardly bent as at 23–24 and provided with elongated openings 25 and 26, respectively, intended to be engaged by said screw-threaded pins 19–20, as schematically shown in FIG. 5.

The central portion of the plate 22 is formed with a plurality of holes 27, one of which is capable of being engaged by a third bolt 28 on the drum 17, as shown in FIG. 5. A plurality of holes 27 is provided in order that the device may be adapted to vehicles having different sizes and types of drums.

The drum bolts 15–16–28 are secured to the arms 1–2 and plate 22, respectively, by means of the same conical nuts which are used to secure the vehicle road wheel, and for this purpose the holes 13–14 and 27 are correspondingly shaped, as shown in dashlines in FIG. 2.

As shown schematically in FIG. 5, once the device has been firmly attached to the vehicle, the latter will remain supported with the parts previously covered by the wheel exposed.

The operation of the device will be readily understood from the above description thereof and requires no further explanation.

When it is desired to replace two vehicle road wheels in the same axle by a pair of devices according to the invention, in order to resist lateral stresses the device to one vehicle drum may be provided with means for connection to one end of a bar, the other end of which may be joined to the device mounted on the opposite drum on the same axle. Said connecting means may be arranged on one of the arms 1-2, and said bar may be adjustable in length in order to adapt same to vehicles of different gauges.

In order to regulate the height to which the vehicle is raised, the spindle of each wheel 5-6 may be mounted on an upstanding bar provided with spaced holes and movable within a substantially vertical opening, comprised by each of said lower arm ends.

It will be understood that in carrying the invention into practice, many changes and/or modifications will occur to those skilled in the art, without departing from the scope of the invention as clearly set forth in the appended claims.

What is claimed is:

1. A device for temporarily replacing an automotive vehicle road wheel, comprising a pair of arms; an inwardly directed projection on each of said arms at a position between the ends thereof; a pivotal connection between said arms in said projections; a small floor wheel rotatably mounted at one end of each of said arms; a hole in the opposite upper end of each of said arms, engageable by a bolt on a vehicle wheel drum; a screw-threaded pin member between said hole and said projection in each of said arms; a plate member having end openings and at least one hole in the middle portion thereof; said end openings being engageable by said arm screw-threaded pin members and said middle hole being engageable by a further bolt on said vehicle wheel drum.

2. A device as claimed in claim 1, wherein the rotation spindle of each of said arm wheels is mounted on an upstanding bar member provided with orifices and movable within a substantially vertical opening at the lower end of each of said arms.

3. A device for temporarily replacing an automotive vehicle road wheel, comprising a pair of arms; an inwardly directed projection on each of said arms at a position between the ends thereof; a pivotal connection between said arms in said projections; a small floor wheel rotatably mounted at one end of each of said arms; a hole in the opposite upper end of each of said arms, engageable by a bolt on a vehicle wheel drum; a screw-threaded pin member between said hole and said projection in each of said arms; a U-shaped plate member having outwardly bent end portions contained in a plane parallel to the middle web portion of said plate; an opening in each of said outwardly bent end portions; at least one hole in the middle web portion of said plate member, said plate end openings being engageable by said arm screw-threaded pin members and said middle plate hole being engagable by a further bolt on said vehicle wheel drum.

4. A device as claimed in claim 3, wherein said plate member is secured to said arms by means of wing nuts screwed onto said screw-threaded pin members on said arms.

5. A device as claimed in claim 3, wherein the opening in each of said outwardly bent end portions of said U-shaped plate is an elongated opening.

6. A device as claimed in claim 3, wherein the holes in said upper arm ends and in said U-shaped plate middle portion are counterbored for receiving conical nut members.

7. A device as claimed in claim 3, wherein said U-shaped plate middle portion is formed with a plurality of spaced holes.

References Cited by the Examiner

UNITED STATES PATENTS 2,493,295   1/1950   Kron _____ 248—352

MILTON BUCHLER, *Primary Examiner.*

L. D. MORRIS, *Assistant Examiner.*